Feb. 27, 1945. H. F. SEIP 2,370,496
TIRE SERVICING RACK
Filed Dec. 22, 1942 2 Sheets-Sheet 1
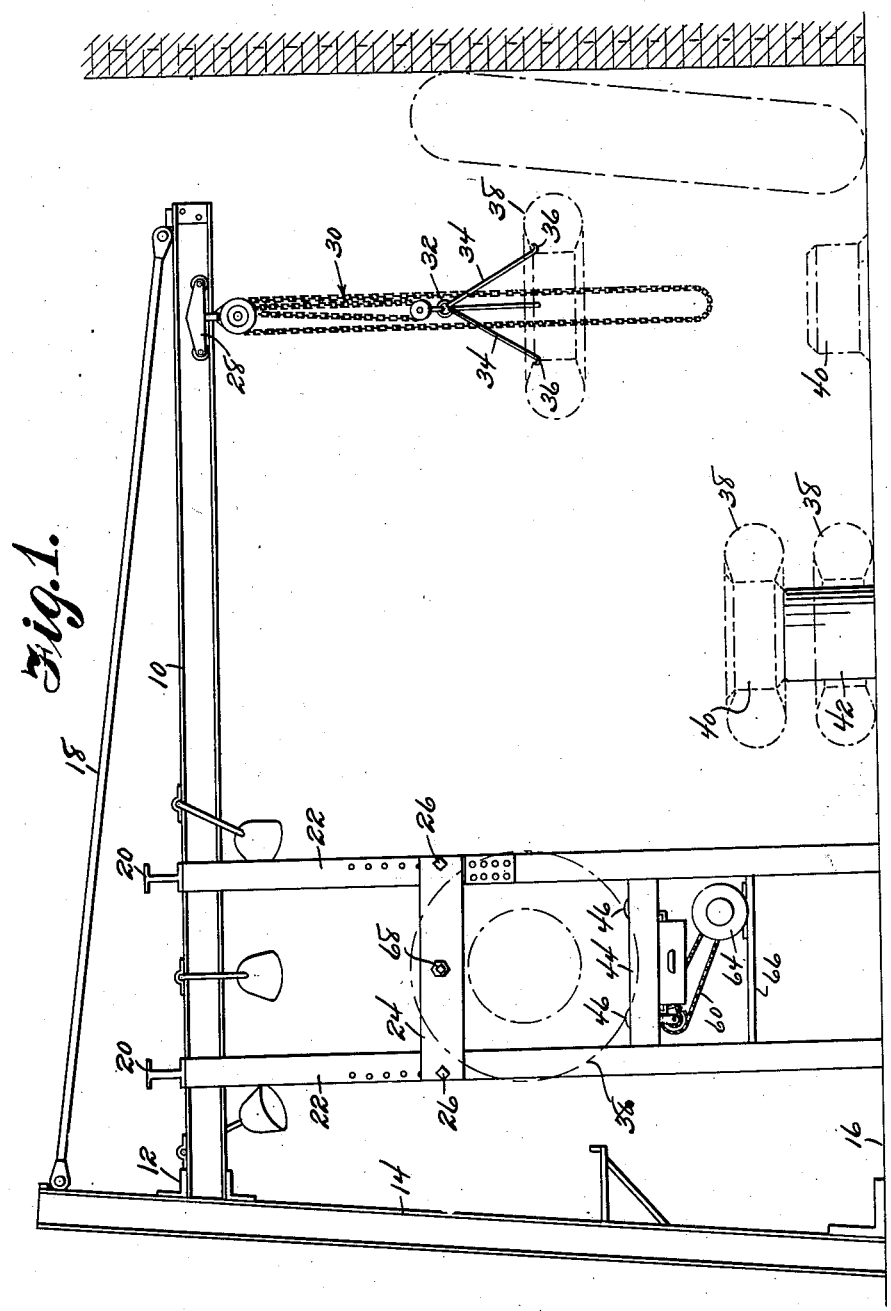
Herbert F. Seip INVENTOR.
BY
*Victor J. Evans & Co.*
ATTORNEYS

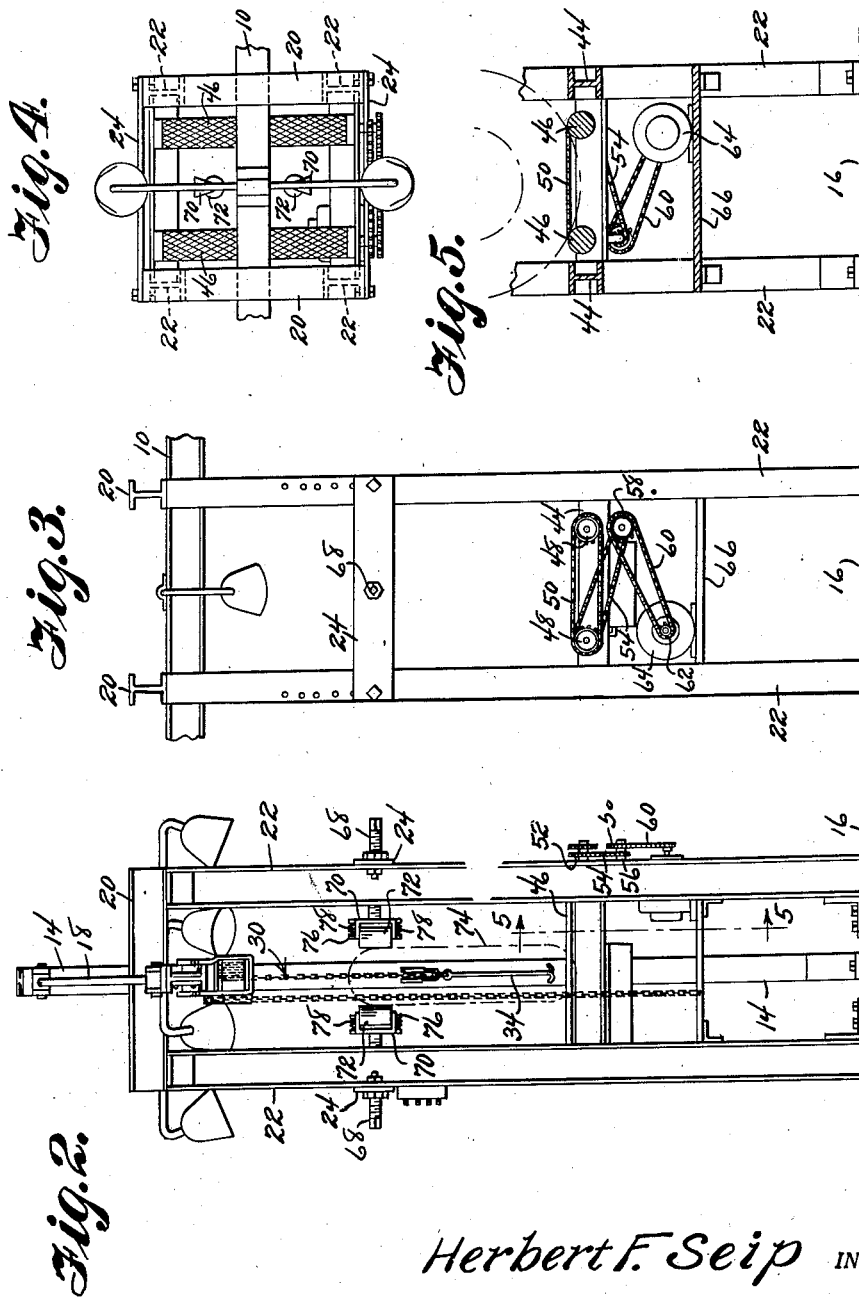

Patented Feb. 27, 1945

2,370,496

UNITED STATES PATENT OFFICE 2,370,496

TIRE SERVICING RACK

Herbert F. Seip, Waltham, Mass.

Application December 22, 1942, Serial No. 469,836

4 Claims. (Cl. 154—9)

My invention relates to the servicing of automotive vehicle wheels and tire casings, and has among its objects and advantages the provision of an improved servicing device.

In the accompanying drawings:

Figure 1 is a side view of my invention.

Figure 2 is an end view.

Figure 3 is a view illustrating a drive for tire supporting rollers.

Figure 4 is a plan view of the structure of Figure 3, and

Figure 5 is a sectional view along the line 5—5 of Figure 2.

In the embodiment of the invention selected for illustration, I make use of a horizontal I-beam or track 10 fixedly secured at 12 to an upright beam 14 fixedly anchored in the earth or floor structure 16. A tie rod 18 has one end connected with the upper end of the beam 14 and its other end attached to the horizontal beam 10 to afford support therefor.

Two beams 20 are welded to the beam 10 and are supported at their ends by vertical channels 22 also anchored to the floor 16. The posts 22 are additionally reinforced by cross members 24 bolted thereto, as at 26.

A trolley 28 operates on the track 10 and is provided with a tackle 30 having a hoist ring 32 provided with lifting rods 34 having hooks 36 engageable inside the bead formation of the tire casing 38 for lifting the casing off its wheel part 40 or for elevating the casing to a convenient inspection position. A block 42 is mounted on the floor 16 and serves as a punch for removing the wheel structure 40 from the tire casing 38. Either system may be employed.

The posts 22 carry cross members 44 within which are rotatably journaled two parallel and horizontal tire casing supporting rollers 46. The rollers 46 are provided with sprockets 48 for connection with a chain 50 to drive the rollers 46 simultaneously and at equal speeds. One of the rollers 46 is provided with a second sprocket 52 for connection with a chain 54 passing around a smaller sprocket 56 fixedly related to a larger sprocket 58 connected with a chain 60 passing around a small sprocket 62 driven by a motor 64. This motor is mounted on a support 66 attached to the posts 22. The sprockets are so proportioned as to drive the rollers 46 at a considerably lower speed than that of the sprocket 62.

Coaxial screws 68 are threaded through the brace members 24 and are provided with brackets 70 which rotatably support rollers 72 engageable with the side faces of the tire casing 74 when placed vertically at rest on the rollers 46. The rollers 72 are rotatably mounted on pins 76 which are urged in the direction of the casing 74 by springs 78. Thus the rollers 72 bear gently against the casing 74 to maintain the casing in its vertical position and to provide compensation for variable contours therein. Both screws 68 may be adjusted to shift the rollers 72 in conformity with tire casings of variable proportions.

Without further elaboration, the foregoing will so fully explain my invention, that others may, by applying current knowledge, readily adapt the same for use under various conditions of service.

I claim:

1. In a tire servicing stand a support having vertical beams, cross members on the beams, a pair of horizontal transversely spaced rollers journaled on the cross members of the support, second cross members on the beams of the support above the rollers, a pair of guide rollers rotatable about vertical axes mounted on the second cross members of the support in positions above the horizontal rollers, means for vertically adjusting the second cross members to adjust the position of the guide rollers on the support, means for adjusting said guide rollers relative to each other horizontally of the support, and means for driving at least one of said horizontal rollers.

2. In a tire servicing stand a support having vertical beams, cross members on the beams, a pair of horizontal transversely spaced rollers journaled on the cross members of the support, second cross members on the beams of the support above the rollers, a pair of resiliently supported guide rollers rotatable about vertical axes mounted on the second cross members of the support in positions above the horizontal rollers, means for vertically adjusting the second cross members to adjust the position of the guide rollers on the support, means for adjusting said guide rollers relative to each other horizontally of the support, and a motor driven gear for driving the respective horizontal rollers in the same direction and at uniform speed for turning a tire casing in vertical position thereon.

3. In a tire servicing stand, a support frame, means on the frame for supporting and turning a tire in vertical position, a pair of cross members detachably mounted on the frame for vertical adjustment thereon, a horizontally adjustable element carried by each cross member, a roller support bracket carried by the inner end of each of said elements, and a guide roller rotatable about a vertical axis mounted on each bracket and engageable with the side walls of a tire.

4. In a tire servicing stand, a support frame, means on the frame for supporting and turning a tire in vertical position, a pair of cross members detachably mounted on the frame for vertical adjustment thereon, a horizontally adjustable element carried by each cross member, a roller support bracket carried by the inner end of each of said elements, a guide roller mounted to rotate about a vertical axis on each bracket, said guide rollers being disposed to contact opposed side wall portions of a tire to maintain the same in vertical position, and spring means resiliently urging the guide rollers against the tire.

HERBERT F. SEIP.